(12) United States Patent
Kassan et al.

(10) Patent No.: US 8,015,209 B2
(45) Date of Patent: Sep. 6, 2011

(54) UNIVERSAL ASSET AND RELATIONSHIP MANAGER

(75) Inventors: Peter Kassan, Dobbs Ferry, NY (US);
Robert Barritz, New York, NY (US);
Steven Barritz, New York, NY (US);
Gerald Cohen, Oakhurst, NJ (US)

(73) Assignee: Treetop Ventures, LLC, Syosset, NY (US)

( * ) Notice: Subject to any disclaimer, the term of this patent is extended or adjusted under 35 U.S.C. 154(b) by 268 days.

(21) Appl. No.: 09/824,404

(22) Filed: Apr. 2, 2001

(65) Prior Publication Data

US 2002/0065825 A1 May 30, 2002

Related U.S. Application Data

(60) Provisional application No. 60/194,166, filed on Apr. 3, 2000.

(51) Int. Cl.
*G06F 17/00* (2006.01)
(52) U.S. Cl. ........ 707/794; 707/795; 707/796; 707/807; 707/825; 705/26; 705/80

(58) Field of Classification Search .................. 707/102, 707/3, 104.1, 794–796, 807; 705/26, 27, 705/80; 709/10, 106
See application file for complete search history.

(56) References Cited

U.S. PATENT DOCUMENTS

| | | | | | |
|---|---|---|---|---|---|
| 5,895,454 | A | * | 4/1999 | Harrington | 705/26.8 |
| 5,983,200 | A | * | 11/1999 | Slotznick | 705/26 |
| 6,038,551 | A | * | 3/2000 | Barlow et al. | 705/41 |
| 6,321,208 | B1 | * | 11/2001 | Barnett et al. | 705/14 |
| 6,505,172 | B1 | * | 1/2003 | Johnson et al. | 705/27 |
| 6,535,880 | B1 | * | 3/2003 | Musgrove et al. | 707/10 |
| 6,560,590 | B1 | * | 5/2003 | Shwe et al. | 706/55 |
| 7,167,844 | B1 | * | 1/2007 | Leong et al. | 705/80 |
| 7,664,667 | B1 | * | 2/2010 | Ruppelt et al. | 705/8 |

* cited by examiner

*Primary Examiner* — Sana Al-Hashemi
(74) *Attorney, Agent, or Firm* — Ostrolenk Faber LLP

(57) ABSTRACT

A universal asset and relationship manager, allows interaction and correlation between user-based data records—which define, list and catalogue user-based assets, comprising both physical assets and information assets—with vendor-based data records, in a manner which enables users to manage, track and service their assets for organizational, upkeep, inventory and business purposes.

19 Claims, 2 Drawing Sheets

Sample of Processing by the RP

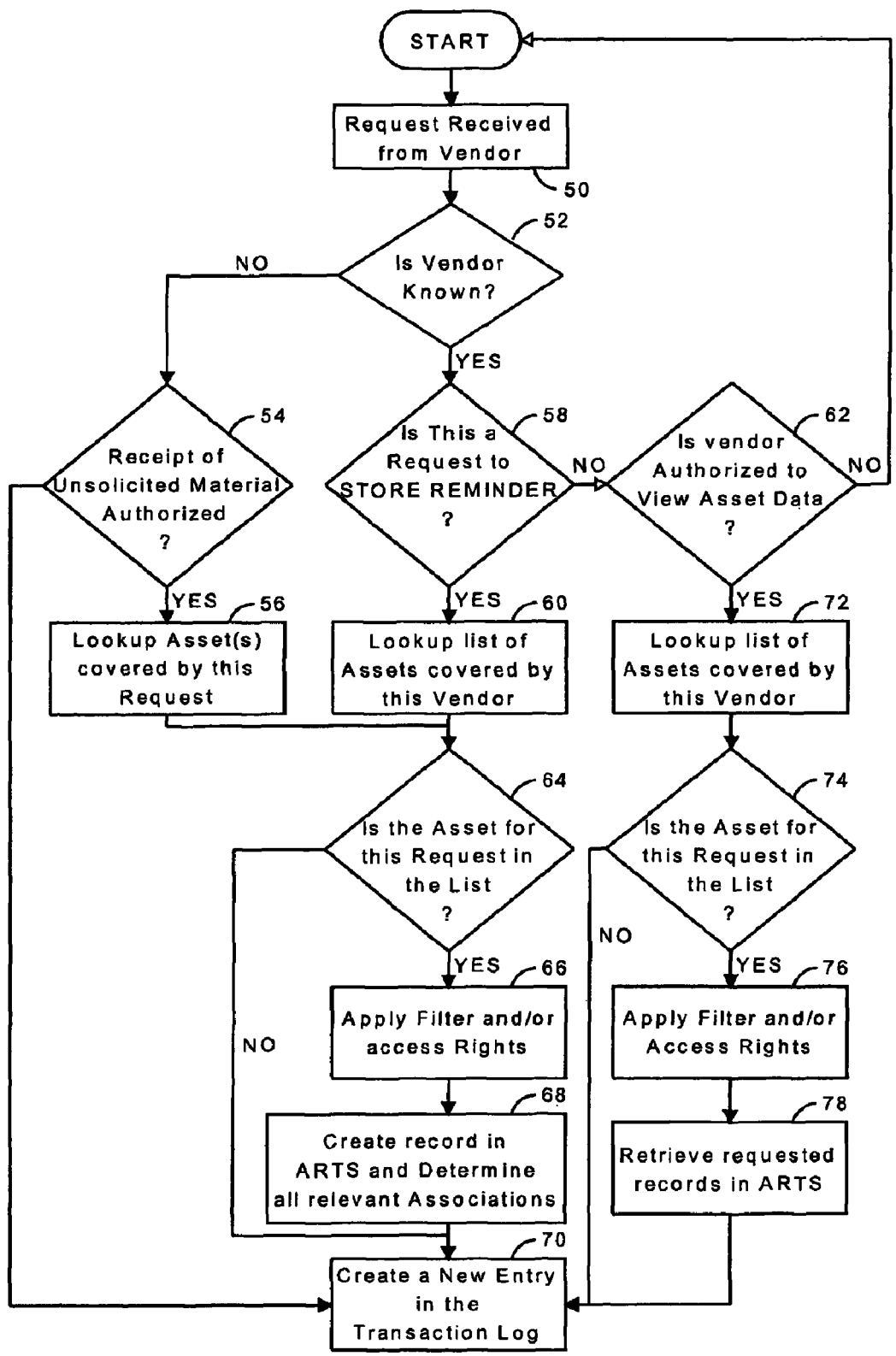
FIGURE 2 - Sample of Processing by the RP

UNIVERSAL ASSET AND RELATIONSHIP MANAGER

RELATED APPLICATION

This Application claims priority and is entitled to the filing date of U.S. Provisional Application Ser. No. 60/194,166, filed Apr. 3, 2000, and entitled "UNIVERSAL ASSET AND RELATIONSHIP MANAGER", the contents of which are incorporated by reference herein.

BACKGROUND OF THE INVENTION

The present invention relates to commerce and, more particularly, to a system for managing assets and relationships.

People, companies, and other organizations ("Consumers") buy, lease and sell things, either physical products, or services. Hereinafter, these products and services are collectively referred to as "assets". Consumers need to keep track (i.e., a detailed inventory) of their assets, for a variety of reasons: warranties; periodic maintenance; payment schedules and history; proof of ownership for insurance purposes; proof of purchase for returns; product recalls because of safety issues; income taxes; etc.

There are also other ongoing relationships, both contractual and less formal, that are unrelated to a physical asset, for example the affiliation with a particular doctor or dentist, or a personal life insurance policy, which still share many of the characteristics described above.

Keeping track of assets for these purposes is burdensome and onerous. Most consumers do not do it fully or effectively. For assets that require periodic maintenance, such as cars, it would be convenient to be reminded automatically of such events. In some circumstances, being fully aware of the extent and details of their assets can promote wiser purchasing and selling decisions.

Moreover, there usually are contracts, agreements, or less formal ongoing relationships that pertain to these assets. For example, a car that is initially purchased or leased has an associated purchase contract or lease agreement. The car's manufacturer provides a warranty. The consumer will obtain liability and collision insurance, and perhaps also an extended warranty. During the course of ownership, ongoing relationships may be established, such as with the local service station that the consumer uses to perform periodic and as-needed maintenance, or with a "detailing" establishment that might be engaged to wash and wax the car periodically.

For a single asset, set of assets, or a class of assets, consumers would benefit by being able to readily determine (or to be automatically reminded of), information such as payment dates, expiration dates, renewal dates, expenditure history, next mandated maintenance date, next scheduled maintenance appointment, etc.

In many cases, the vendor also has an interest in tracking the particulars of their contract or ongoing relationship with the consumer. For example, while many vendors have their own internal systems for keeping track of their relationships with their customers, many vendors might still find it useful to have access to the consumer information described above in order to send reminders to the consumer that it's almost time to have their teeth cleaned or their oil changed; or simply to suggest various goods and services, such as clothing, that complement or supplement their existing assets or relationships.

And in some cases, the consumer may wish to permit access to classes of vendors, even those with whom the consumer has had no prior relationship, in order to allow those vendors to propose goods and services.

In some circumstances, a consumer will have in his inventory various types of assets which he routinely acquires, sells or trades, e.g., jewelry, clothing, fine arts, collectables, stamp collections, etc. An individual selling his own car through the conventional means of print advertising is generally bombarded with repetitive and annoying telephone calls for detailed information and must manually filter these to determine a genuine prospect. Similarly, when purchasing items such as clothing, the consumer is more likely to make a wiser purchasing decision if he/she is fully aware of the existing contents of their closets and the closets of immediate family members.

SUMMARY OF THE INVENTION

It is an object of the present invention to provide a system for managing assets and relationships.

It is a further object of the invention to provide an assets and relationships managing system that could be operated substantially automatically.

It is yet another object of the present invention to provide an assets and relationships managing system that facilitates and promotes business interactions between users-consumers and vendors of physical and information products.

It is still a further object of the present invention to provide an assets and relationships managing system that substantially reduces the time required by users to manage their assets and the relationships.

A still further object of the present invention is to provide an assets and relationships managing system that reduces incidents of inattention to assets and relationships due to human error and the like.

The foregoing other objects of the invention are realized by an assets tracking, managing and servicing system that is constituted largely by a plurality of user-referenced subsystems, on the one hand, which interact with a plurality of vendor-referenced subsystems, on the other hand, to create a cooperative system which, both automatically and manually, improves the task of tracking, managing and servicing the assets and relationships of users.

In preferred embodiments, the invention includes a user-referenced subsystem including, for each of a plurality of users, respective A/R DBs and further including a records associator and a request processor. The A/R DB comprises user-based assets and/or relationship (A/R) data records. A plurality of the above subsystems interact with a plurality of service/product, vendor-referenced databases comprising SP/V data records that relate to corresponding user A/R data records. The SP/V data records comprise service and product information. A C/C (control/communication) subsystem enables interaction between the A/R data records that are user-referenced and the SP/V data records that are vendor-referenced in a manner that creates current user information.

The asset-related information can include one or more of: warranties; periodic maintenance; payment schedules; payment history; proof of ownership of assets; proof of purchase; product recall data; tax related information; installment payment dates; expiration dates; renewal dates; expenditure history; next mandated maintenance date; time and date of transactions; vendor; personal data of purchaser; addressing information of recipient; personal demographic information about purchaser and/or recipient; generic description of an asset; contract terms and conditions; entity purchased from; and contact information.

In its various embodiments, the system of the invention may also include a security controller that is operable to set a variety of authorization levels that determine the A/R records to which the request processor has access, based on criteria such as: user ID; requestor PIN; type of access rights granted; data that pertains to assets associated with a requestor; transaction code; A/R data record category and vendor class. The user's data can be encrypted and may also include personal or preference information. Access to the data can come from vendors based on modes of operation which includes solicited and unsolicited requests.

Other features and advantages of the present invention will become apparent from the following description of the invention which refers to the accompanying drawings.

BRIEF DESCRIPTION OF THE DRAWINGS

FIG. 2 is a flowchart of some of the steps carried out by the present invention.

DETAILED DESCRIPTION OF THE PRESENT INVENTION

Figure 1:
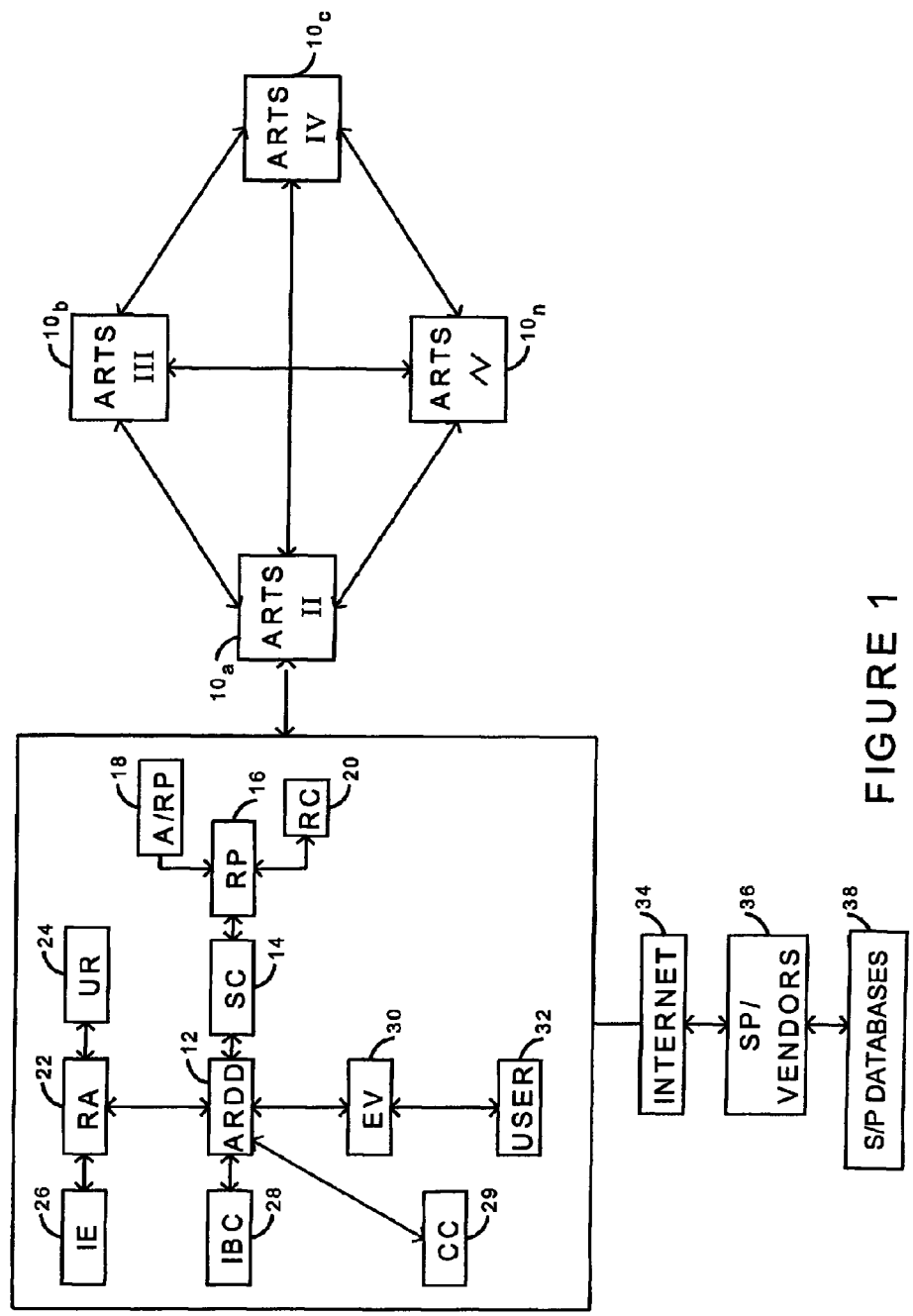
FIG. 1 is a general layout and diagram of various components of the system of the present invention.

The present invention, an asset and relationship tracking system (ARTS), includes the following components:

ARTS Repository (A/R DB): The A/R DB is a database of personal asset and relationship information organized according to a unique consumer identification code (ID), and all data pertaining to a particular consumer is tagged with that consumer's ID, thus segregating information about each consumer, while still recording all the information in a common database. Optionally, the A/R DB contains personal preference information or links to a repository (Individualization Wallet) that contains such information. Personal preference information consists of data such as: color, pattern, fabric and styles, and size information; individual characteristics such as: birthday, gender, hair, eye and skin color, allergies, pierced ears, language spoken, marital status, number, age and gender of children, religion, profession, hobbies, musical tastes, political alignment; and financial information such as credit and debit card accounts.

Optionally, the data is further categorized by the type of data it contains, e.g., asset type, vendor, contract, etc.

Each record or group of records contained in the A/R DE has a consumer-specified authorization level which is used to allow access to specific individuals and organizations. Typically, such access is the ability to add or change records, restrict to read-only access, or to prohibit any access at all.

Typical details of a transaction (lease, contract, sale, etc.) that would be communicated to the RP for storage in the A/R DE include:

Time and date of transaction
Vendor
Name, address, phone number, email address, etc. of purchaser
Name, address, phone number, email address, etc. of recipient (if different from above)
Optionally, personal demographic information (age, sex, income, etc.) about purchaser and recipient
Generic description of item (car, book, CD, clothing, jewelry, etc.)
Manufacturer, model, year, options, etc.
Physical characteristics (size, capacity, color, etc.)
Warranties or support purchased
Details of the transaction (purchase, lease, rental, etc.)
How paid
Contract terms and conditions
Store purchased from, location, etc.
Contact information (support personnel, phone numbers, email addresses, etc.)

Basic proof-of-purchase information can be supplied by the vendor or by the system used by the vendor for clearing transactions made using credit cards, debit cards, ATM cards, digital cash, computer-based gift certificates, flooz, beanz, etc.

ARTS Security Controller (SC): The SC is a software process, operative on the consumer's computer, a remote computer or a website, that provides various levels and types of privacy protection and security of the data contained within the A/R DB. All requests to access or change data within the A/R DB are administered and validated by the SC which in turn either grants or denies access to the A/R DB in accordance to user-specified controls. The SC security controls and features can include any of the following:

1. Access to the ARTS by anyone other than the consumer (or designated consumer) requires the vendor to select the consumer by specifying a user-identification code, alias, or other identifier, and not the consumer's real name.
2. Access requires a PIN, password or other code to be entered by the consumer
3. Anonymity—The consumer's identity (name, address, financial information, etc.) is not disclosed until a sales transaction is consummated, and then only that information that is required to complete the transaction.
4. Access rights—read, write, modify and delete is selectable by the consumer and given to a single vendor or set of vendors.
5. Encrypted repository—The A/R DB is encrypted to prevent unauthorized access to the A/R DB and the decoding of copies made for the purpose of backing up the data. Such encryption can be applied to the entire repository, to consumer-specified vendor records, or to arbitrarily consumer-selected records.
6. ARTS information that is stored on a vendor system requires the consumer to supply a PIN, password or other code prior to that data being made available to the vendor.
7. The vendor has rights to only view data that it has stored in the A/R DB, and not that of other vendors.
8. The vendor must be certified or designated by consumer. The vendor may have its own access password, use data encryption technology and/or possess a digital certificate.
9. The vendor may only store information in the A/R DB for which it has obtained a transaction number or code.
10. The consumer can establish time limited rights to a vendor in addition to any other controls already established for that vendor. Such rights can be specified as any or all of a start date and time, end date and time, or duration.
11. Categories—The consumer can specify one or more vendors to belong to one or more of a pre-defined/consumer-defined set of categories (e.g., Automotive, Insurance, Women's clothing, etc.). Any of the previously described security controls that are applied to a specific category will automatically be established as default controls for each vendor in this category.

Optionally, the consumer may specify that these controls override any controls previously set for the vendors in this category.

12. Class of vendors—The consumer can specify one or more vendors to belong one or more of a consumer-defined set of vendors. For example, a consumer's favorite vendors in a particular shopping mall. Any of the previously described security controls that are applied to a specific class will automatically be established as default controls for each vendor in this class. Optionally, the consumer may specify that these controls override any controls previously set for the vendors in this class.

13. The SC maintains an activity log detailing vendors making requests and their disposition.

Additional security measures can include encrypted communications in combination with a "trusted agent" on the Vendor's system. A trusted agent in a software process that is distributed to vendors specified by the user. The agent is a means of secure communications with the ARTS. Any information retrieved from the A/R DB by the agent is provided to the Vendor's system in accordance with the transaction being performed. Optionally, the agent inhibits the vendor from storing or using this information if the current transaction is not consummated.

ARTS Request Processor (RP): The RP is a software process that receives requests from another process or a remote computing facility (RC) for the purpose of retrieving from or storing information in the A/R DB on behalf of the consumer. Such information requests can be according to specific records or by category, and are made in accordance to the authorization levels set by the consumer.

Under consumer control, the RP will respond to requests from vendors to store detailed information about an asset, a set of assets, or class of assets. This information may contain specific details as the result of a purchase or lease; or reminders, notices, promotional information, etc. Optionally, the consumer may establish access rights or filters that are applied to specific assets, a group of assets, a class of assets, vendors, type of information, etc.

Optionally, and under consumer control, the RP will respond to unsolicited requests for detailed information about an asset, a set of assets, or class of assets from other organizations (or consumers) for the purpose of disposing of these assets or acquiring similar assets.

Optionally, and under consumer control, the RP will respond to unsolicited requests for detailed information about an asset, a set of assets, or class of assets from other organizations (or individuals) for the purpose of obtaining a proposal for a service or price quotation for products related to these assets. Optionally, the RP will assign a unique transaction number to each request such that the requesting organizations can store an electronic quotation or other such notice for the consumer. The consumer may also establish a time period during which such requests will be honored and quotations accepted. Alternatively, the proposed products might be available on an e-commerce website in which case the consumer benefits when, for example, purchasing a sport jacket to have the details of his "closet" communicated to the merchant so that selections can be customized and the presence or absence of matching accessories identified. Note that this will enable vendors to "troll" the A/R DB for consumers who have opened access to the vendor's category and may wish to receive unsolicited proposals. For example, a life insurance company might invoke the RP, requesting information pertaining, successively, to each consumer represented in the A/R DB who has opened access to life insurance-related vendors. Then, depending on the information obtained, the insurance company might formulate a proposal, which might be delivered electronically, optionally through the auspices of the ARTS itself.

Optionally, and under consumer control, the RP will respond to unsolicited requests for preference data from authorized advertisers, marketing research firms, etc. and make available the requested data for the purpose of conducting marketing research.

Optionally, and under consumer control, the RP will maintain a log of any or all of the activities that occur for the consumer to review.

Optionally, and under consumer control, the RP will maintain a history of such transactions for future review and reference.

Record Associator (RA): The RA is a facility for automatically establishing an association between A/R DB records of one type (e.g., automobiles, jewelry, clothing, collectables, computers, etc.) with records of another type (e.g., purchase contract, insurance policy, warranty, service provider(s), vendor, etc.) whenever certain identifying features match.

For example, a single insurance company can provide one or more insurance policies that encompass a single asset or multiple assets. A single automobile policy can insure multiple vehicles, thus encompassing multiple A/R DB records, and a personal liability policy will provide additional insurance for the consumer's home and all covered automobiles. Such policies typically contain a description of the insured item(s) such as model, serial number, etc. that are used by the RA to establish the appropriate associations.

Typically, an association is tentatively established at the time a transaction is made, such as a car purchase where, at the time of purchase, an insurance binder (or existing policy) is used until the actual (existing) policy can be issued (amended). The consumer establishes a rule for the RA that associates the insurance binder (policy) to the newly acquired car. Thus, when the actual policy is received by the RP, the RA retrieves the association so that the RP can store the appropriate data in the A/R DB.

Optionally, the RA determines possible associations or associations that are most probable using an Inference Engine (IE). The IE is a software component of the RA that analyzes the consumer's transactions, as they occur (or the history of transactions), in order to derive probable associations. This is based upon associations made in the past and the heuristics of evaluating the similarity of an item name, identification number, or other such criteria between items in one record and items in one or more other records. [Techniques that could be applied include: Soundex coding, pattern matching, dictionary lookup, and/or Fuzzy Logic.] The results may be displayed for consumer selection, confirmation, or rejection. For each item to be associated, the RA provides as many candidates as are appropriate, ranked alphabetically or in likelihood of match. All such candidate associations can be displayed in a distinctive color; the user could tab or scroll directly from one such candidate association to the next and confirm or reject each one in turn, or could highlight and accept or reject several such candidate associations at once.

Optionally, the user provides a set of rules by which the RA establishes an association between records in the A/R DB. Rules that can be established include:

Treat XYZ Insurance Co. and XYZ Insurance International (a wholly-owned subsidiary) as one and the same.

All requests received by the RP from service providers classified as "automotive" are associated to A/R DB records of the same type.

All requests received by the RP from XYZ Insurance Co. are associated to home and personal possessions exclusive of automobiles.

Optionally, the RA provides a facility by which the consumer specifies an association between one or more items in a list of records with an item in another record. The consumer might use a pointing device such as a computer mouse to highlight one or more of the items on the first list of records and the item on the other list. Optionally, the RA presents an opportunity for the consumer to confirm the association before it is processed.

ARTS Editor/Viewer (EV): The EV enables the consumer to manually enter or change asset information; vendor information; access authorizations; categories for data organization; asset and contractual information; etc. For a set of records, presumably from the same vendor, wherein the same changes must be applied to multiple records, the EV automatically applies those changes for the consumer. At the same time, the EV permits the user to examine the details of a single asset, group of assets, or promotional offers and reminders that have been received. In either edit or view mode, the EV accepts selection criteria from the consumer, such as by vendor, asset, maintenance schedules, or other specifications as appropriate.

The EV also displays two or more lists of A/R DE records, that have been associated by the RA, sorted by asset name, vendor name, warranty, service provider, or other identifying feature. Once displayed, the EV permits the consumer, where applicable, to make changes and/or corrections to those records. Any changes made, are automatically made, where appropriate or permitted, to the corresponding records from which the associated items are composed. For a set of records, presumably from the same vendor, wherein the same changes must be applied to multiple records, the EV automatically applies those changes for the user. In either edit or view mode, the EV accepts selection criteria from the consumer, such as by vendor, automobile, collectable, service provider, or other specifications as appropriate.

Individual Best Coordinator (IBC): The IBC is a process that provides decision support to the consumer based upon the current transaction and the current assets in the consumer's A/R DB. Using heuristics and rules established by the consumer, the IBC analyzes the current transaction against the current assets of the same type, and optionally, the consumer's history of such transactions, and provides one or more suggestions.

For example, a consumer considering the purchase of a black evening gown would find it useful to know what black evening gowns are already owned, when they were last worn, at what function, etc. Based upon the type of gown (beaded, lace, etc.) are there accessories in the A/R DB that match?

In another example, a consumer considering wearing a navy sport jacket would find it useful for the IBC to suggest matching slacks, shirt, and, most importantly, a necktie.

The ARTS can be resident on the consumer's computer, however, in a preferred embodiment, the repository and RP are contained on one or more centralized computing facilities or an Internet website that acts as a central repository and clearinghouse for such information.

Via the Internet or other form of convenient remote access, the ARTS allows individual consumers to access information about the purchases they made, sorting by time, date, description, store, manufacturer, etc., etc. The consumer can also update information in these records, for example to note that an item was disposed of, when, how, and why. When transferring ownership of an item, the consumer can also instruct the RP to transfer the applicable A/R DB records of the item to the corresponding A/R DB record(s) of the buyer.

In an alternative implementation, the data for each individual consumer is not maintained on the centralized site or sites, but is transmitted to the individual consumer's computer for storage in a private database. In such an implementation, the central site acts primarily as a clearinghouse, and the functionality described here runs on the individual's computer. For example, a company could use such a system for maintaining information pertaining to the software it has licensed.

Various types of information may be placed into the A/R DB, from a variety of sources. Typically, most of this information is available at the time that a transaction occurs, be it a purchase, rental, lease, contract signing, etc., and these details can be supplied directly by the vendor, most conveniently as a result of the transaction itself (via an interface from the vendor's own transaction registry system to the RP) or, less desirably, as a separate operation requiring the user to enter it using the EV.

Other information can be supplied directly by the consumer, either at the time of the transaction or at a later time.

For the acquisition of physical goods, the consumer designates one or more authorized service providers in one or more categories. Those service providers, as authorized by the consumer, are given access to authorized portions of the centralized database both to view relevant information, to update it as appropriate and to place notifications and alerts in the database that the system would then display or otherwise communicate to the acquirer. The consumer is able to view the information placed by these service providers, change which service providers are authorized to provide service for a particular item, etc.

For example, the consumer at the time of purchase of an automobile designates the insurance carrier, the auto maintenance shop [by default, the original dealer], the auto detailer, etc. Periodically, the dealer or other service provider can record the details of maintenance performed and then follow up with a reminder that an oil change should be scheduled.

Under certain circumstances, the consumer may engage a transaction for which information concerning his current assets and/or history of assets may be influential or helpful in consummating the transaction. As mentioned earlier, the RP will, under user control, respond to unsolicited requests for detailed information about an asset, a set of assets, or class of assets from other organizations.

Under certain circumstances, the consumer may intentionally desire to obtain quotations for a service or product related to one or more of his current assets. For example, obtaining quotations for automobile insurance generally requires that the consumer disclose the vehicle identification number of each car, driver license numbers, as well as, other relevant information. As mentioned earlier, the consumer can instruct the RP to respond to requests from specified vendors or unsolicited requests from any vendor for detailed information about such assets in order to prepare a quotation. The consumer may also establish a window in time for such requests and the receipt of quotations. Optionally, the RP may assign a transaction number to the requesting organization to use in its quotation in order to track such requests and to filter out "junk" quotations, marketing material, etc. that are received but for which there is no registered transaction.

Multiple relationships are established among entities in the database. For example, multiple contracts (warranty, support, insurance, etc.) can be associated with a given item (e.g., a car). As another example, items can be associated with each other (e.g., a muffler purchased for a particular car).

The EV provides multiple views of the data. For example, a particular consumer can ask to see all the items purchased from a particular vendor, all contracts with a particular service provider or asset, all items of a particular type, etc. Additional selection criteria can be a specified time period, owned or leased, etc.

Optionally, if the consumer so desires, the ARTS can be instructed to consult a database supplied by the manufacturer or another authorized source of information, schedule reminders that the consumer can receive via e-mail, pop-up window, or other form of notification, of required events such as car maintenance. Also optionally, the system can notify the consumer's local source of maintenance (e.g., local auto shop) to schedule time for such maintenance and permit coordination between shop and consumer.

Optionally, the consumer can associate events with any item, and have reminders generated by the system, in a similar way.

Optionally, the display presented to the consumer includes an Internet link to the manufacturer's web site, optionally passing to it details about the item and the consumer, allowing the manufacturer's web site to display appropriate information, such as a owner's manual, warranty details, optional special features, etc.

Optionally, if the consumer permitted it, the ARTS allows the consumer to query it about users of a device the consumer owns, optionally filtered by location, demographic region, etc., so that users of the same device could communicate with each other to help support each other or simply as an interest group.

Optionally, if the consumer permitted it, the ARTS allows the consumer to query it about users of a device the user does not yet own, to get those user's evaluation of the item.

Optionally, the ARTS allows consumers to record their evaluations of items, for other consumers to access on an individual or aggregated basis.

Optionally, the ARTS allows a manufacturer to communicate with users of one or more particular items or types of items, for safety recalls, product upgrades, optional add-ons, offers of extended warranty, customer surveys, or simply marketing purposes.

Optionally, the ARTS permits the consumer to place an item he owns on an Internet auction site, such as Ebay. Optionally, the ARTS populates the auction form with detailed information, e.g., description, photograph, etc.

Though most of the preceding examples have related to the way in which ARTS is applicable to individuals, many of the ARTS facilities would be useful and beneficial to businesses and organizations, who also have, for example, assets, relationships and contracts, and seek services, bids and proposals.

With reference to FIG. 1, the ARTS 10 is an asset and relationship transaction management system which tracks and integrates transactional activities of a large number of users and corresponding product and service providers. It consists of many subsystems, including user-referenced components $10_a$, $10_b$, $10_c$ ... $10_n$. One of these components, $10_e$, is shown in greater detail to illustrate the typical subcomponents thereof. The overall ARTS system 10 communicates typically via the Internet 34, but optionally through dedicated LANs, WANs and the like, with service and/or product vendors 36, which maintain large databases about their products and services, as indicated by the SP/V DBs 38 block in the figure. Also as shown in the figure, communications can be conducted between any one of the subsystems $10_a$ ... $10_n$, and corresponding SP/Vendors 36 and their databases 38.

A typical user-referenced subsystem $10_e$ is defined by an A/R DB (assets/relationships database) 12 to which a respective user-owner 32 has access via an editor/viewer 30, as a shown and as described previously.

Most typically, persons and entities other than the user (and the user in some cases) may access the information in the A/R DB 12 via the security controller 14 which buffers information requests through the request processor 16, which processor receives such requests from other request processors 18 or from remote controllers 20.

As previously described, the A/R DB 12 is operable in conjunction with a rule associator 22 which generates or stores various rules of association for data records in the A/R DB 12, which data records may include user defined rules, represented by the UR 24, as well as associations that are derived from an inference engine 26. Optimal correlation, categorization and grouping of data records is also provided, via the previously described IBC 28. The block C/C 29 represents the overall control and communication block which attends to local, as well as system-wide, communications with other user-based A/R DBs included in $10_a$ ... $10_n$, the Internet 34, as well as requests, whether solicited or not, from SP Vendors 36, which may arrive via the Internet 34 or other communication links.

Turning to FIG. 2, examples of transactions associated with the system 10 of the present invention include a request received from a vendor at step 50, which leads to decision box 52, which determines whether the vendor is known. If the vendor is not known, then decision box 54 determines whether receipt of unsolicited material has been authorized, which then leads to the path defined by steps 56, 64, 66, 68 or 70, on the one hand, or step 70, on the other hand.

If the vendor is known, the process proceeds from step 52 to step 58 to determine whether this is a request to store a reminder, which, if yes, leads to the step 60. That step looks up a list of assets covered by the particular vendor and thereafter proceeds in accordance with the aforementioned steps 64, 66, 68 and 70.

If, on the other hand, this is a request to view asset data, the process follows steps 72, 74, 76 and 78, as indicated. If none of the above apply, the process proceeds from the step 62 to the start block, awaiting another request from a vendor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for tracking assets purchased by a consumer, and managing future services to be performed for the assets, the system comprising:

processor readable media operatively coupled to one or more processors;

at least one database provided on the processor readable media, the at least one database storing at least:

electronic asset information including information representing assets that are purchased and owned by a plurality of consumers;

electronic asset category information including information representing a plurality of categories of the assets;

electronic service information including information representing at least one future service to be respectively performed for at least one of the assets;

electronic identification information including information representing at least one of a plurality of consumers;

electronic vendor information including information related to vendors that sell the assets to the plurality of consumers, service the assets after the assets are purchased by the plurality of consumers, or both sell and service the assets for the assets that are purchased by the plurality of consumers;

the processor readable media having instructions for causing the following steps to be performed by the one or more processors:

receive over a communication network from a first user computing device electronic transaction information, wherein the electronic transaction information includes information representing an acquisition of at least one asset, a vendor identifier representing at least one vendor to provide at least one future service to be performed for the at least one asset, and an identifier representing the consumer who purchased the at least one asset;

receive, over the communication network from a second user computing device associated with the at least one vendor to provide the at least one future service, electronic service information that represents the at least one future service to be performed for the at least one asset;

determine based on at least the electronic transaction information and the electronic service information that a first service is scheduled for the at least one asset at a first time; and transmit, over the communication network, an electronic notification to the first user computing device that the first service is scheduled, wherein the transmitting occurs at a second time relative to the first time.

2. The system of claim 1, wherein the processor readable media further has instructions for causing the one or more processors to group the electronic asset information into groups of records, wherein the groups of records represent at least the categories of records.

3. The system of claim 1, wherein the electronic asset information further includes one or more data items selected from an information data group consisting of: warranties; periodic maintenance; payment schedules; payment history; proof of ownership of assets; proof of purchase; product recall data; tax related information; installment payment dates; expiration dates; renewal dates; expenditure history; and next mandated maintenance date.

4. The system of claim 1, wherein the electronic asset information further includes one or more data items selected from an information data group consisting of time and date of transactions; vendor; personal data of purchaser; addressing information of recipient; personal demographic information about purchaser or recipient; generic description of an asset; contract terms and conditions; entity purchased from; and contact information.

5. The system of claim 1, wherein the processor readable media further has instructions for causing the one or more processors to set a variety of authorization levels that determine and select records in the database that correspond with the variety of authorization levels.

6. The system of claim 1, wherein records in the at least one database are encrypted.

7. The system of claim 1, wherein the electronic identification further includes respective personal preference information of the plurality of consumers.

8. The system of claim 1, wherein the processor readable media further has instructions for causing the one or more processors to respond to unsolicited requests for detailed information about the assets.

9. The system of claim 1, wherein the processor readable media further has instructions for causing the one or more processors to receive a request for information from remote computing facilities.

10. The system of claim 1, wherein the processor readable media further has instructions for causing the one or more processors to associate the at least one asset with at least one category represented by the electronic asset category information associations at the time a transaction is made.

11. The system of claim 1, wherein the processor readable media further has instructions for causing the one or more processors to display at least one of the electronic asset information, the electronic category information the electronic service information and the electronic identification information for the purposes of editing and viewing the same.

12. The system of claim 1, wherein the processor readable media further has instructions for causing the one or more processors to provide decision support to at least one of the plurality of consumers based on at least one of a transaction and one or more assets owned by the at least one of the plurality of consumers.

13. The system of claim 12, wherein the decision support is based on heuristics and rules established by the user.

14. The system of claim 1, wherein the processor readable media further has instructions for causing the one or more processors to enable user-to-user communications.

15. The system of claim 1, wherein the processor readable media further has instructions for causing the one or more processors to enable user-to-vendor communications and the transference of information from vendor-based databases to users at the request of users.

16. The system of claim 1, wherein the processor readable media further has instructions for causing the one or more processors to schedule one of the vendors to perform a service for the at least one asset.

17. The system of claim 4, in which the data items also include transaction type information including: purchase, rental, lease, and contract signing.

18. The system of claim 5, in which the authorization levels are based on criteria selected from a criteria group that consists of: a user identifier; a requestor personal identification number; type of access rights granted; data that pertains to assets associated with a requestor; transaction code; asset and relationship tracking repository data record category; and vendor class.

19. The system of claim 9, in which the request processor assigns a unique transaction number to each of the requests.

* * * * *